United States Patent [19]

Walburn

[11] 3,770,281

[45] Nov. 6, 1973

[54] TAPE RECORDER WITH AUTOMATIC PROGRAM SELECTOR

[76] Inventor: Richard H. Walburn, 2930 Rolling Wood Dr., San Mateo, Calif. 94066

[22] Filed: July 20, 1971

[21] Appl. No.: 164,254

[52] U.S. Cl. .......... 274/4 D

[51] Int. Cl. .......... G11b 15/18, G11b 27/20

[58] Field of Search .......... 274/4 C, 4 D, 4 R, 274/11 C, 11 D; 242/201,191, 202, 203, 208; 235/132 R, 132 E

[56] References Cited

UNITED STATES PATENTS

| | | | |
|---|---|---|---|
| 2,396,409 | 3/1946 | Berzer | 274/4 D |
| 3,167,264 | 1/1965 | Ohtsu | 242/208 |
| 3,118,599 | 1/1964 | Mann | 235/132 R |
| 3,097,793 | 7/1963 | Mitchell | 235/132 R |
| 3,061,191 | 10/1962 | Hultgren | 235/132 R |
| 3,627,228 | 12/1971 | Wolfe | 242/57 |
| 3,032,285 | 5/1962 | Brede | 242/208 |

*Primary Examiner*—Harry N. Haroian
*Attorney*—Flehr, Hohbach, Test, Albritton & Herbert

[57] ABSTRACT

Tape recorder with built-in program selector for moving a tape to a predetermined point in either the forward or reverse direction and automatically recording or playing back program beginning at that point. The program selector includes a reversible multi-digit counter which is connected to the take-up reel through a reversible gear train. The gear train is arranged in such manner that the counter counts up when the tape moves at the normal speed in the forward direction and counts down when the tape either moves in the reverse direction or moves at the fast speed in the forward direction. When the counter counts down to a predetermined count, tape movement is interrupted, and the tape is transduced at the normal speed in the forward direction.

6 Claims, 5 Drawing Figures

INVENTOR
RICHARD H. WALBURN
By Flehr, Hohbach, Test, Albritton & Herbert
ATTORNEYS INVENTOR
RICHARD H. WALBURN
BY Fehr, Hohbach, Test, Albritton & Herbert
ATTORNEYS

TAPE RECORDER WITH AUTOMATIC PROGRAM SELECTOR

SUMMARY AND OBJECTS OF THE INVENTION

This invention pertains generally to tape recorders and more particularly to a tape recorder having an automatic program selector for advancing a tape to a predetermined point so that a desired program can be recorded or played back at that point.

The program selector includes a reversible multi-digit counter which is mounted in the base of the recorder and operably connected to the take-up reel through a reversible drive gear train. The gear train is arranged in such manner that the counter counts up when the tape is being transduced at the normal speed in the forward direction and counts down when the tape is either moving in the reverse direction or moving at the fast speed in the forward direction. A set of switch contacts controlled by the counter is connected for de-energizing the motive means of the recorder to interrupt the movement of the tape when the counter reaches a number corresponding to the location of a desired program on the tape. Thereafter, the motive means is conditioned for moving the tape at the normal speed in the forward direction so that the desired program can be recorded or played back.

It is in general an object of the present invention to provide a new and improved program selector for tape recorders.

Another object of the invention is to provide a program selector of the above character which constitutes an integral part of the recorder.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
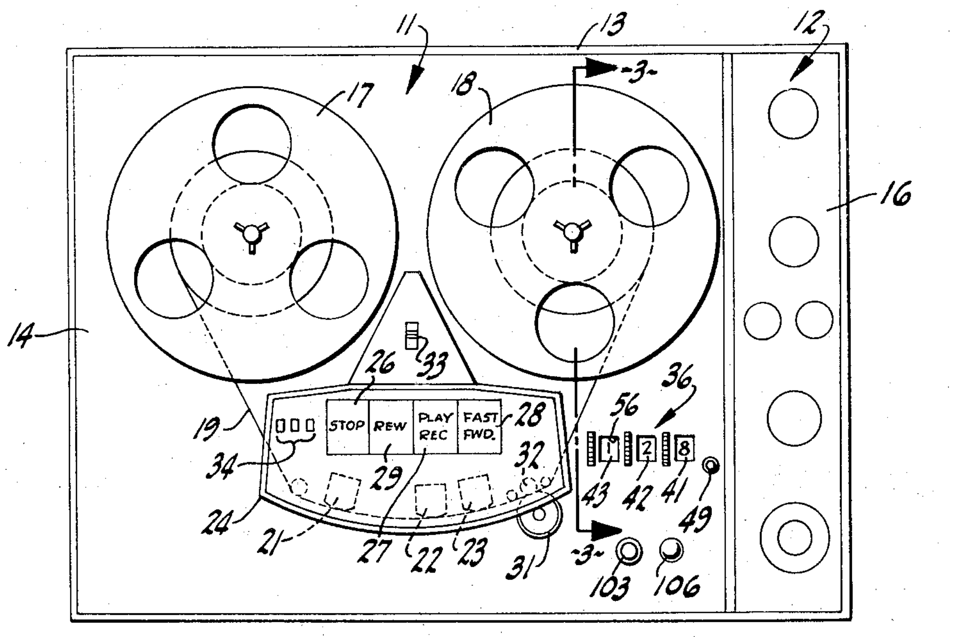
FIG. 1 is a top plan view of one embodiment of a tape recorder having an automatic program selector incorporating the present invention.
Figure 3:
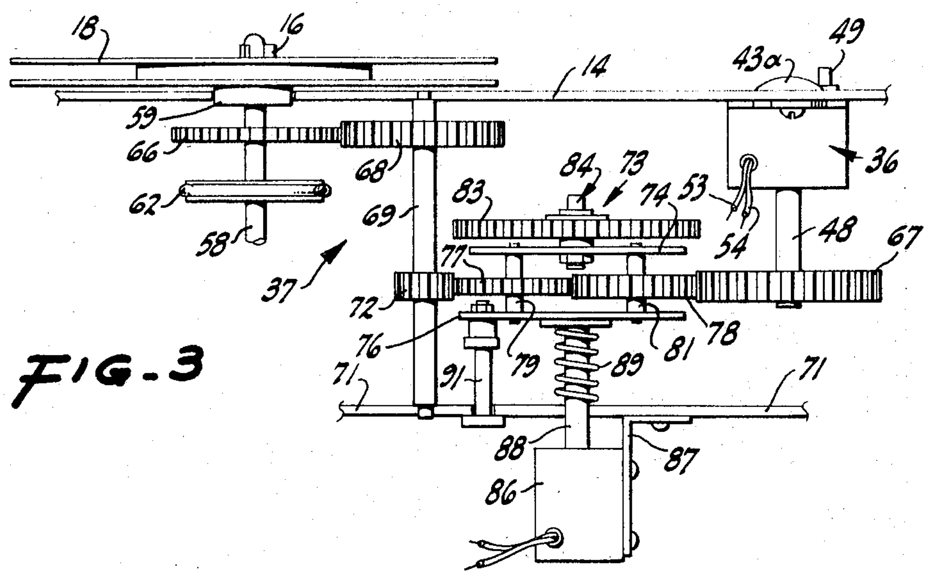
FIG. 3 is a sectional view taken along the line 3—3 in FIG. 1, illustrating the manner in which the counter is connected to the take-up reel of the recorder through a reversible drive gear train.

The tape recorder shown in FIG. 1 includes a transport section 11 and a record/playback amplifier section 12, both of which are mounted in a cabinet 13. The transport section is mounted on and below a transport deck 14, and the amplifier section is covered by a control panel 16.

The transport section includes a supply reel 17 and a take-up reel 18 upon which a magnetic recording tape 19 is wrapped. A plurality of magnetic transducing heads 21–23 are provided for recording, playing back and erasing signals on the tape as it moves between the supply and take-up reels. The transducing heads are covered by a cover plate 24.

An electrically energized motor and suitable driving mechanism are mounted below the transport deck 14 for moving the tape 19 between the reels 17 and 18 at a plurality of different speeds. Movement of the tape is controlled by a stop button 26, a record/playback button 27, a fast-forward button 28, and a rewind button 29. These buttons are linked mechanically to the drive mechanism, and they condition it for various modes of operation in a conventional manner. When the stop button 26 is depressed, the motor is de-energized, and the tape is at rest. When the record/playback button 27 is depressed, a pinch roller 31 presses the tape against a drive capstan 32 and the tape moves in the forward direction (toward the take-up reel) at a speed determined by a slide switch 33. This switch permits selection among desired speeds in the record/playback mode such as 1⅞, 3¾ and 7½ inches per second. When the fast forward button 28 is depressed, the take-up reel 18 is driven in the proper direction to wrap the tape thereon, and when the rewind button 29 is depressed, the supply reel 17 is driven to rewind the tape thereon. In both the fast-forward and rewind modes, the tape moves much faster than it does in the record/playback mode. A conventional footage counter 34 monitors the movement of the tape and indicates which portion of the tape is proximate to the heads and in position to be transduced.

The amplifier section 12 includes suitable amplifiers of conventional design for amplifying the signals delivered to and from the transducing heads during the recording and playback modes. Controls for these amplifiers are mounted on the control panel 16. These controls include a record/playback selector switch which determines whether a program is recorded or played back when the transport mechanism is in the record/playback mode.

An automatic program selector is provided for advancing the tape to a predetermined point in either direction, stopping the tape at that point, and automatically placing the transport mechanism in the record/playback mode so that a desired program can be played back or recorded at that point. The program selector includes a reversible multi-digit counter 36, a reversible gear train 37 connecting the counter to the take-up reel 18, and control circuits of the type shown in FIGS. 4 and 5.

Figure 2:
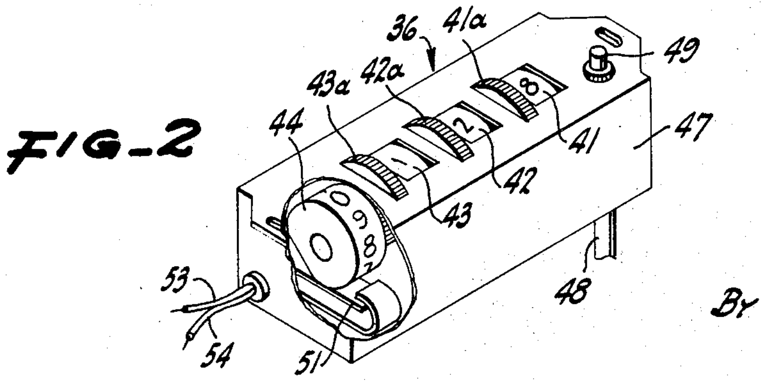
FIG. 2 is a perspective view partially broken of a multi-digit counter which can be used in the program selector of the recorder shown in FIG. 1.

The counter 36 can be of a type commonly used for conventional footage counters in tape recorders. A suitable four-digit counter is illustrated in FIG. 2. This counter includes a units wheel 41, a tens wheel 42, a hundreds wheel 43, and a thousands wheel 44. The wheels are visible through windows 46 which are provided in the upper wall of the counter housing 47. The wheels are driven by an input shaft 48 in a conventional manner to provide a four-digit count of the number of revolutions made by the input shaft. Knurled thumbwheels **41*a*–43*a* provide means for setting the counter to any desired count, and a reset button 49 provides means for resetting the counter to 0 0 0 0. A set of electrical contacts 51 is mounted below thousands wheel 44, and a flat cam surface 52 is provided on this wheel opposite the digit 9. This wheel functions as a cam, holding the contacts 51 open when the count registered by the wheel is any number other than 9. When the wheel moves to the position in which the digit 9 appears in the window in the upper wall of the counter housing, the flat surface 52 is down, permitting the contacts to close. Electrical connections are made to the contacts by means of leads 53 and 54**.

The counter 36 is mounted on the lower surface of the transport deck 14, with the units wheel 41, tens wheel 42 and hundreds wheel 43 being visible through windows 56 in the deck and the thousands wheel 44 being concealed from view by the deck. The thumbwheels 41a-43a extend through suitable openings in the deck.

The gear train 37 is mounted below the transport deck 14 between the take-up reel 18 and the counter 36. The take-up reel is mounted in a conventional manner on a shaft 58 which passes through the deck 14. This shaft includes a flange 59 upon which the reel rests and a plurality of radially extending splines 61 which engage slots in the reel and constrain it for rotation with the shaft. The shaft is rotatably mounted in suitable bearings, not shown, and a drive belt pulley 62 is mounted on the shaft. A drive belt, not shown, connects this pulley to the remainder of the recorder's drive mechanism.

The gear train 37 includes an input gear 66 affixed to the take-up reel shaft 58 and an input gear 67 affixed to the input shaft 48 of the counter 36. The input gear 66 engages a large spur gear 68 which is affixed to a shaft 69. This shaft is rotatably mounted between the transport deck 14 and a chassis member 71. A small spur gear 72 is also affixed to the shaft 69.

A reversible transmission 73 is provided between the small spur gear 72 and the output gear of the gear trains. This transmission includes a gear carrier comprising an upper plate 74 and a lower plate 76. These plates are held together in a fixed, spaced-apart relationship by suitable spacers which, for convenience of illustrations, have been omitted from the drawings. A pair of meshing forward gears 77 and 78 are mounted on shafts 79 and 81, respectively, which are rotatably mounted between the carrier plates. A reverse gear 82 is rotatably mounted on the upper carrier plate 74 by means of a shaft assembly 84.

The gear carrier is movable between upper and lower positions for selectively engaging either the combination of forward gears 77 and 78 or the single reverse gear 83 with the spur gear 72 and the output gear 67. When the forward gears 77 and 78 are engaged, the direction of the counter corresponds to the direction of the tape movement, e.g. the counter counts up when the tape moves forward. When the reverse gear 83 is engaged, the counter counts down when the tape moves forward. The pitch diameter of the reverse gear 83 is equal to the sum of the pitch diameters of the forward gears 77 and 78, and while these gears permit the direction of the counters to be reversed, they do not affect the overall ratio of the gear train.

Means is provided for moving the gear carrier between its upper and lower positions. This means includes a solenoid 86 which is mounted on the chassis member 71 by means of a bracket 87. The solenoid includes an electrically energized coil and a plunger 88 which is connected to the lower carrier plate 76. A compression spring constrained between the lower carrier plate and the chassis member urges the carrier assembly to its upper position when the solenoid is deenergized. When the solenoid is energized, the carrier assembly is drawn to its lower position, engaging the reverse gear 83 with the spur gear 72 and the output gear 67. A guide pin 91 extends from the lower carrier plate 76 and passes through an opening in the chassis mamber 71. This guide pin prevents rotation of the carrier assembly and limits the upward extent of its travel.

Figure 4:
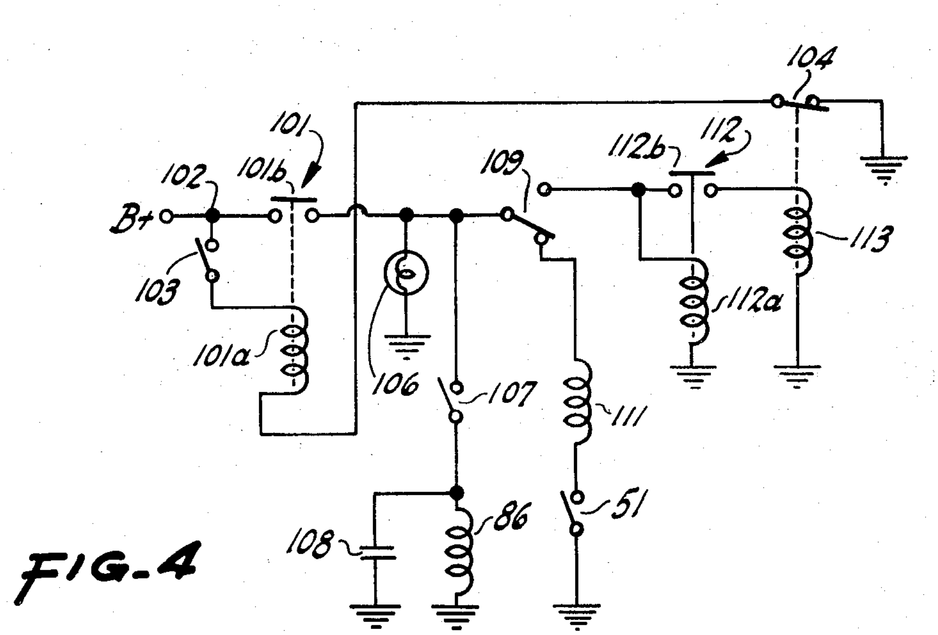
FIG. 4 is a schematic diagram of one embodiment of a control circuit for the program selector of the tape recorder illustrated in FIG. 1.

A relay-operated control circuit for the automatic program selector is illustrated in FIG. 4. This system includes a power relay 101 having an operating coil **101*a* and a set of normally open contacts 101*b*. One of these contacts is connected to a power input terminal 102 which is connected to the positive terminal of a d.c. voltage source. The negative terminal of the voltage source is connected to the system ground. One end of the relay coil 101*a* is connected to the power input terminal to a switch 103. In the preferred embodiment, this switch is a latching pushbutton switch which is mounted on the transport deck 14. The other end of the relay coil is connected to ground through a set of normally closed switch contacts 104. A pilot lamp 106 is connected between the output of the power relay and group to indicate when this relay is energized. This lamp is mounted on the transport deck next to the pushbutton switch 103**.

Power is supplied to the reversing gear solenoid coil 86 from the relay 101 through a set of switch contacts 107. These contacts are linked to the recorder's drive mechanism in such manner that they are closed when the fast-forward button 28 is depressed and open when the recorder is in all other modes. A capacitor 108 is connected across the solenoid coil 86.

The output of the power relay 101 is also connected to the movable contact of a single-pole, double-throw switch 109. One contact of this switch is connected to one end of the coil of a recorder shut-off solenoid 111, and the other end of this coil is connected to ground through the counter switch contacts 51. The solenoid 111 is connected to the drive mechanism of the recorder and functions in a manner similar to the stop button 26 to interrupt the movement of the tape when energized.

The other contact of the switch 109 is connected for supplying power to the operating coil **112*a* and contacts 112*b* of a time-delay relay 112. In the preferred embodiment, this relay is chosen to provide a time delay on the order of two seconds between the energization of the coil 112*a* and the closing of the contacts 112*b***.

The single-pole, double-throw switch 109 is linked to the drive mechanism of the recorder in such manner that it is in the position shown when the recorder is in the rewind or fast-forward modes. It moves to the other position when the movement of the tape is interrupted. In one presently preferred embodiment, the switches 107 and 109 are reed switches which are operated by a magnetic placed on a suitable actuator arm of the recorder's drive mechanism.

Power from the delay relay 112 is supplied to a record/play solenoid 113. This solenoid is connected to the recorder's drive mechanism in such manner that when energized it places the recorder in the record/-playback mode. This solenoid is also connected to the switch contacts 104 in such manner that these contacts are opened when the solenoid is energized.

Operation and use of the automatic program selector can now be described. Let it be assumed that the tape 19 has just been placed on the recorder and the counter 36 reads 0 0 0 0. Further let it be assumed that the listener desires to hear a program commencing at 1 2 8 on the tape. He sets the counter to 0 1 2 8 by means of the thumbwheels *41a–43a*, depresses the fast-forward button 28, and presses the switch 103 to energize the program selector. With the switch 103 closed, the power relay 101 is energized and power is delivered to the switch contacts 107 and 109. With the fast-forward button depressed, the tape moves at a high speed in the forward direction, and the switch contacts 107 are closed. Thus, the solenoid 86 is energized, engaging the reverse gear 83 with the spur gear 72 and the output gear 67, and the counter counts down at a rate corresponding to the movement of the tape. When the counter passes through 0 0 0 0 to 9 9 9 9, the switch contacts 51 close, energizing the shut-off solenoid 111. The movement of the tape is interrupted, and the switch 109 moves to its other position, energizing the delay relay 112. After a two-second delay, the contacts of this relay close, energizing the record/play solenoid 113, and the desired program plays automatically. The energization of the relay 113 also opens the contacts 104, de-energizing the power relay 101 to turn off the program selector.

The recorder is now operating in the normal record/playback mode. The switch contacts 107 are open, and the relay 86 is de-energized. Thus, the counter 36 is driven through the forward gears 77 and 78, and it counts up from 0 0 0 0 as the program plays.

Having heard the program, the listener can play it again simply by depressing the rewing button 29 and the program selector switch 103. In this situation, the switch contacts 107 remain open, and the counter is driven through the forward gears 77 and 78. However, the counter counts down because the tape is moving in the reverse direction. When the counter reaches 9 9 9 9, the movement of the tape is interrupted and the program plays in the manner described above.

Operation of the program selector to automatically record at a given point on the tape is identical to the playback operation discussed above. The user controls whether a particular program is recorded or played by means of the record/playback switch associated with the amplifier section of the recorder.

Figure 5:
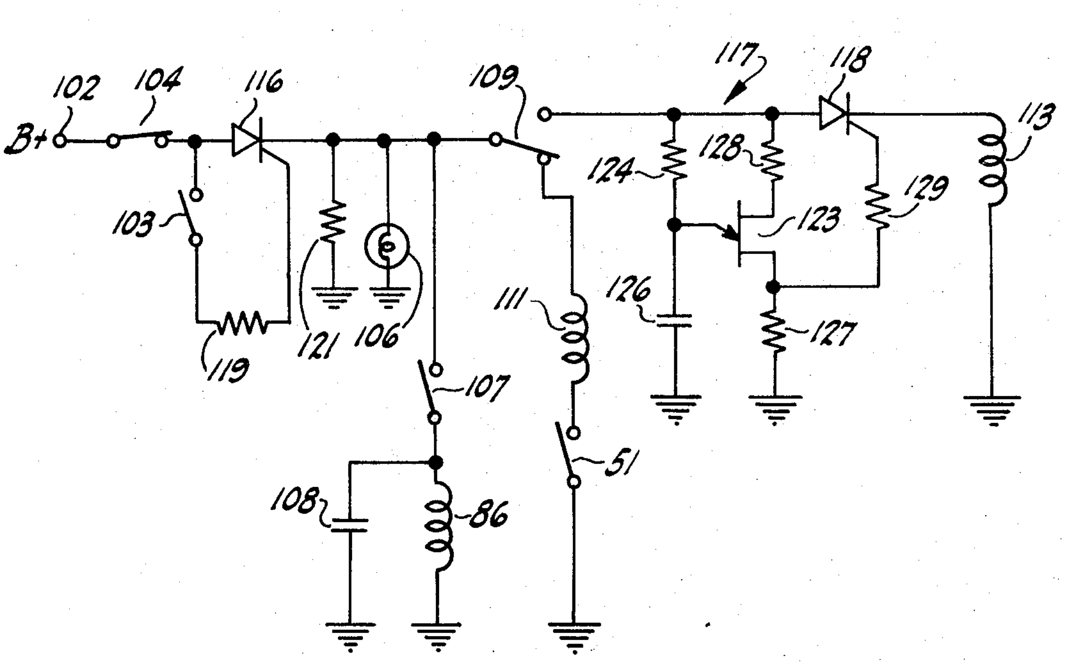
FIG. 5 is a schematic diagram of another embodiment of a control circuit for the program selector of the tape recorder illustrated in FIG. 1.

A second embodiment of a control circuit for the program selector is illustrated in FIG. 5. This embodiment is generally similar to the relay-operated circuit shown in FIG. 4 except the power relay has been replaced by a silicon controlled rectifier (SCR) 116 and the delay relay has been replaced by a delay network 117 and a silicon control rectifier 118. In this embodiment, the normally closed contacts 104 are connected between the power input terminal 102 and the anode of SCR 116. The pushbutton switch 103 is connected in series with a resistor 119 between the anode and gate of the SCR, and a load resistor 121 is connected between the cathode and ground. The cathode is also connected to the lamp 106 and the switch contacts 107 and 109.

The delay network includes a unijunction transistor (UJT) 123. A timing resistor 124 is connected between the emitter of the UJT and one contact of the switch 109. A timing capacitor 126 is connected between the emitter and ground. A resistor 127 is connected between the base-one and ground, and a resistor 128 is connected between the base-two and the switch 109. The anode of SCR 118 is also connected to this switch contact, and a resistor 129 is connected between the base-one of the UJT and the gate of the SCR 118. The cathode of this SCR is connected to the record/play solenoid 113.

Operation of the program selector with the control circuit shown in FIG. 5 is generally similar to that described above. When the pushbutton switch 103 is closed, the SCR 116 fires, delivering power to the remainder of the circuit. When the movement of the tape is interrupted and the switch 109 moves to its upper position, the capacitor 126 charges through the resistor 124. When the voltage of the capacitor rises to the threshold level of the UJT 123, this transistor turns on, firing the SCR 118 to energize the solenoid 113. When this solenoid is energized, the contacts 104 open, interrupting the flow of current to the system and turning off the SCRs 116 and 118. The values of the resistor 124 and the capacitor 126 are chosen such that it takes about two seconds to charge the capacitor to the level required to turn on the UJT.

Like the embodiment of FIG. 4, the control circuit shown in FIG. 5 provides a program selector which can automatically move a tape to a predetermined point in either the forward or the reverse direction and then transduce a desired program beginning at that point. The program can be either recorded or played back, as the user desires.

It is apparent from the foregoing, that a new and improved program selector system for tape recorders has been provided. While only the presently preferred embodiments have been described herein, as will be apparent to those familiar with the art, certain changes and modifications can be made without departing from the scope of the invention as defined by the following claims.

I claim:

1. In a tape recorder having electrically energized motive means for moving a tape in forward and reverse direction, said motive means being adapted for selectively moving the tape at first and second speeds in the forward direction, a reversible multi-digit counter forming an integral part of the recorder, reversible drive gear means connecting the counter to the motive means for driving the counter in one direction when the tape is moving at the first speed in the forward direction and driving the counter in the opposite direction when the tape is moving at the second speed in the forward direction, and switch means operably connected to the counter and motive means for interrupting the movement of the tape when the counter reaches a predetermined number.

2. A tape recorder as in claim 1 together with means for conditioning the motive means to move the tape at the first speed in the forward direction a predetermined time after the movement of the tape is interrupted.

3. In a tape recorder having supply and take-up reels and electrically energized motive means for moving a tape in forward and reverse directions between said reels, said motive means being adapted for selectively moving the tape at first and second speeds in the forward direction, a multi-digit counter forming an integral part of the recorder, drive gear means connecting the counter to the motive means for driving said counter in one direction when the tape is moving at the first speed and driving the counter in the opposite direction when the tape is moving at the second speed, switch means operably connected to aid counter and said motive means for interrupting the movement of the tape when said counter reaches a predetermined number, and means for conditioning said motive means to move the tape at the first speed in the forward direction after the movement of the tape is interrupted.

4. A tape recorder as in claim 3 wherein said drive gear means includes an input gear constrained for rotation with the take-up reel, an output gear operably connected to said counter, a drive train providing a predetermined gear ratio between the input and output gears, and means for changing the number of gears in said train while maintaining the ratio between said input and output gears constant.

5. A tape recorder as in claim 1 wherein the drive gear means is adapted for driving the counter in the opposite direction when the tape is moving in the reverse direction.

6. A tape recorder as in claim 4 wherein the means for changing the number of gears includes an electrically energized solenoid.

* * * * *